US007527587B2

(12) United States Patent
Laughlin

(10) Patent No.: US 7,527,587 B2
(45) Date of Patent: May 5, 2009

(54) CENTRIFUGAL SEPARATOR AND METHOD FOR SEPARATING HEAVY AND LIGHT MATTER IN A SUBSTANCE

(76) Inventor: Henry J. Laughlin, 8869 Meadowgate Ct., Huber Heights, OH (US) 45424

( * ) Notice: Subject to any disclaimer, the term of this patent is extended or adjusted under 35 U.S.C. 154(b) by 91 days.

(21) Appl. No.: 11/736,025

(22) Filed: Apr. 17, 2007

(65) Prior Publication Data

US 2008/0257836 A1 Oct. 23, 2008

(51) Int. Cl.

| | |
|---|---|
| ***B04B 5/10*** | (2006.01) |
| ***B01D 21/26*** | (2006.01) |
| ***B01D 43/00*** | (2006.01) |
| ***B01D 45/00*** | (2006.01) |
| ***B04B 1/00*** | (2006.01) |
| ***B04B 1/04*** | (2006.01) |

(52) U.S. Cl. ............................ 494/35; 494/22; 494/37; 494/67; 494/68; 494/80; 210/377

(58) Field of Classification Search ...... 210/360.1–382; 494/22, 35, 37, 67, 68, 80, 34, 43
See application file for complete search history.

(56) References Cited

U.S. PATENT DOCUMENTS

| | | | | |
|---|---|---|---|---|
| 273,127 | A * | 2/1883 | Muller et al. | 494/27 |
| 622,408 | A * | 4/1899 | Aspinall et al. | 209/48 |
| 902,913 | A | 11/1908 | Risberg | |
| 917,123 | A * | 4/1909 | Peck | 494/29 |
| 1,016,366 | A * | 2/1912 | Sanford | 494/30 |
| 2,036,924 | A * | 4/1936 | Coutor | 494/22 |
| 2,199,847 | A * | 5/1940 | Bryson | 494/44 |
| 2,236,769 | A * | 4/1941 | Armbruster | 210/360.1 |
| 2,622,796 | A * | 12/1952 | Steinacker et al. | 494/10 |
| 3,172,851 | A * | 3/1965 | Ambler | 494/37 |
| 3,332,614 | A * | 7/1967 | Webster et al. | 494/22 |
| 3,348,767 | A * | 10/1967 | Ferney | 494/27 |
| 3,459,368 | A * | 8/1969 | Dollfus | 494/22 |
| 4,468,234 | A | 8/1984 | McNicholas | |
| 5,222,935 | A * | 6/1993 | Schlarb | 494/54 |
| 5,735,789 | A | 4/1998 | Borgstrom et al. | |
| 6,221,260 | B1 | 4/2001 | Chahine et al. | |
| 6,346,069 | B1 * | 2/2002 | Collier | 494/3 |
| 6,500,345 | B2 | 12/2002 | Constantine et al. | |

* cited by examiner

*Primary Examiner*—Tony G Soohoo
*Assistant Examiner*—David C Mellon
(74) *Attorney, Agent, or Firm*—R. William Graham

(57) ABSTRACT

A centrifugal separator includes devices for light matter extraction and for heavy matter extraction. Each embodiment provides for a plurality, e.g., two or more stacked or layered chambers, and connected to a central compartment of the chambers is a rotating drive shaft. In the light matter extraction, a central conduit feeds fluid input into the lower chamber. An upper portion of the lower chamber communicates with the lower portion of a mid chamber via a port formed in a plate dividing the chambers. The upper portion of the mid chamber communicates with the lower portion of an upper chamber via a port formed in a plate dividing the chambers. The chambers can be fixably connected to one another. In the heavy matter extraction an initial feed conduit feeds fluid into the upper chamber.

17 Claims, 7 Drawing Sheets

CENTRIFUGAL SEPARATOR AND METHOD FOR SEPARATING HEAVY AND LIGHT MATTER IN A SUBSTANCE

FIELD OF THE INVENTION

The present invention relates to a centrifugal separator to separate a liquid of one or more suspended substances dispersed therein by means of centripetal force acting on matter having varying density. More particularly, the instant invention is directed to an improved a multi level separator for use in purifying liquid, such as water or oil, for example.

BACKGROUND OF THE INVENTION

Centrifugal separators (or centrifuges) generally employ a piece of equipment, generally driven by a motor, which puts an object in rotation around a fixed axis, applying force perpendicular to the axis. The centrifuge works using the sedimentation principle, where the centripetal acceleration is used to separate substances of greater and less density. For example, material densities for several substances are as follows:

| Liquids | g per $cm^3$ |
|---|---|
| Water at 4 C. | 1.0000 |
| Water at 20 C. | 0.998 |
| Gasoline | 0.70 |
| Mercury | 13.6 |
| Milk | 1.03 |

| Solids | g per $cm^3$ |
|---|---|
| Magnesium | 1.7 |
| Aluminum | 2.7 |
| Copper | 8.3-9.0 |
| Gold | 19.3 |
| Iron | 7.8 |
| Lead | 11.3 |
| Platinum | 21.4 |
| Uranium | 18.7 |
| Osmium | 22.5 |
| Ice at 0 C. | 0.92 |

| Gases at STP | g per $cm^3$ |
|---|---|
| Air | 0.001293 |
| Carbon dioxide | 0.001977 |
| Carbon monoxide | 0.00125 |
| Hydrogen | 0.00009 |
| Helium | 0.000178 |
| Nitrogen | 0.001251 |

| Organisms | g per $cm^3$ |
|---|---|
| Vegetative cells | 1.135 |
| Average spore | 1.305 |

There are many different kinds of centrifuges, including those for very specialized purposes. One type of separator includes a rotor rotatable around a rotational axis. Inside the rotor is formed an inlet chamber, a separation chamber connected to the inlet chamber, and an outlet chamber connected to the separation chamber, for liquid which has been cleaned of the substance. In the separation chamber a stack of several frusto-conical separation discs is arranged coaxially with the rotational axis. The separation discs are provided with distancing elements, which keep the discs at a distance from each other so that in pairs they form interspaces. The centrifugal separator also comprises means for conducting the liquid and the substance dispersed therein, during operation, from the inlet chamber to a central part of the disc interspaces in a way such that liquid flows radially outwardly in the interspaces.

The liquid mixture to be centrifugally treated is normally conducted into the interspaces via supply holes centrally located in the separation discs. The flow is directed essentially in the circumferential direction and the radially outwardly directed flow of liquid will take place in thin so-called Ekman-layers along the upper and underside of the separation discs. The radially outwardly directed flow of liquid is distributed in thin Ekman-layers. This means that the flow velocity in these layers becomes high and that the layer of substance, which during operation has been separated in an interspace and accumulates on a radially outwardly directed side of a separation disc. With conventional separators, there is a risk of having the substance entrained in the flow of the liquid. Centrifugal separators of this kind are commonly used in a marine context to clean water polluted by oil and do not substantially provide an acceptable solution.

The present invention provides a centrifugal separator which improves on the prior centrifuges by use of a novel separation mechanism.

SUMMARY OF THE INVENTION

It is an object to provide a centrifugal separator with improved means of separation.

It is another object to provide a centrifugal separator having multiple layers and corresponding outlets for enhanced separation.

It is another object to refine separation through an improved centrifugal separation device having a recirculation and secondary separation treatment.

It is a further object to provide a centrifugal separator having multiple layers and corresponding outlets for enhanced separation and collection of heavy or light matter.

Accordingly, the present invention is directed to a centrifugal separator which includes two embodiments. One embodiment is for light matter extraction and one is for heavy matter extraction. In each embodiment, there are provided a plurality, e.g., two or more stacked or layered chambers. Connected to a central compartment of the chambers is a rotating drive shaft.

In the light matter extraction, a central conduit feeds fluid input into the lower chamber. An upper portion of the lower chamber communicates with the lower portion of a mid chamber via a port formed in a plate dividing the chambers. The upper portion of the mid chamber communicates with the lower portion of an upper chamber via a port formed in a plate dividing the chambers. The chambers can be fixably connected to one another.

The chambers are rotatably disposed within an outer container which is subdivided into lower, mid, upper, and top compartments. The lower, mid, and upper compartments surround each respective lower, mid, and upper chamber and each compartment communicates with a respective chamber via an outlet formed in a side of each respective chamber. The upper portion of the upper chamber communicates with the top compartment via a port on the upper plate. The lower compartment communicates with an outlet formed in side of container which leads to an outlet for collecting heavy matter residual. The mid compartment communicates with an outlet formed in side of container which leads to an outlet to feed effluent back into the lower chamber via the central conduit. An upper compartment communicates with an outlet formed in side of container which leads to an outlet to feed effluent from the upper chamber back into the mid chamber via a concentric cylinder to the central conduit. Fluid reaching an upper portion of the upper chamber escapes through a port formed therein and passes through another outlet formed in the container and is collected as a light matter residual.

In the heavy matter extraction, a conduit feeds fluid input into the upper chamber. An upper portion of the lower chamber communicates with the lower portion of a mid chamber via a port formed in a plate dividing the chambers. The upper portion of the mid chamber communicates with the lower portion of an upper chamber via a port formed in a plate dividing the chambers. The chambers can be fixably connected to one another.

Another aspect of the invention is directed to a method of separating light and heavy matter. The method includes the steps of (a) employing a centrifugal separator of the type described, and (b) inputting a substance having heavy matter and light matter therein into one of the chambers of the separator, and (c) rotating the chambers to cause the separation of the heavy matter and the light matter, wherein at least a portion of the heavy matter passes through at least one outlet and a portion of the light matter passes through the port in the plate to enable recovery thereof.

The invention will be more readily appreciated and understood by reading the detailed description and drawings appended hereto.

BRIEF DESCRIPTION OF THE DRAWINGS

The invention will be further described with reference to the accompanying drawings, in which.

DETAILED DESCRIPTION OF THE PREFERRED EMBODIMENTS

Figure 1:
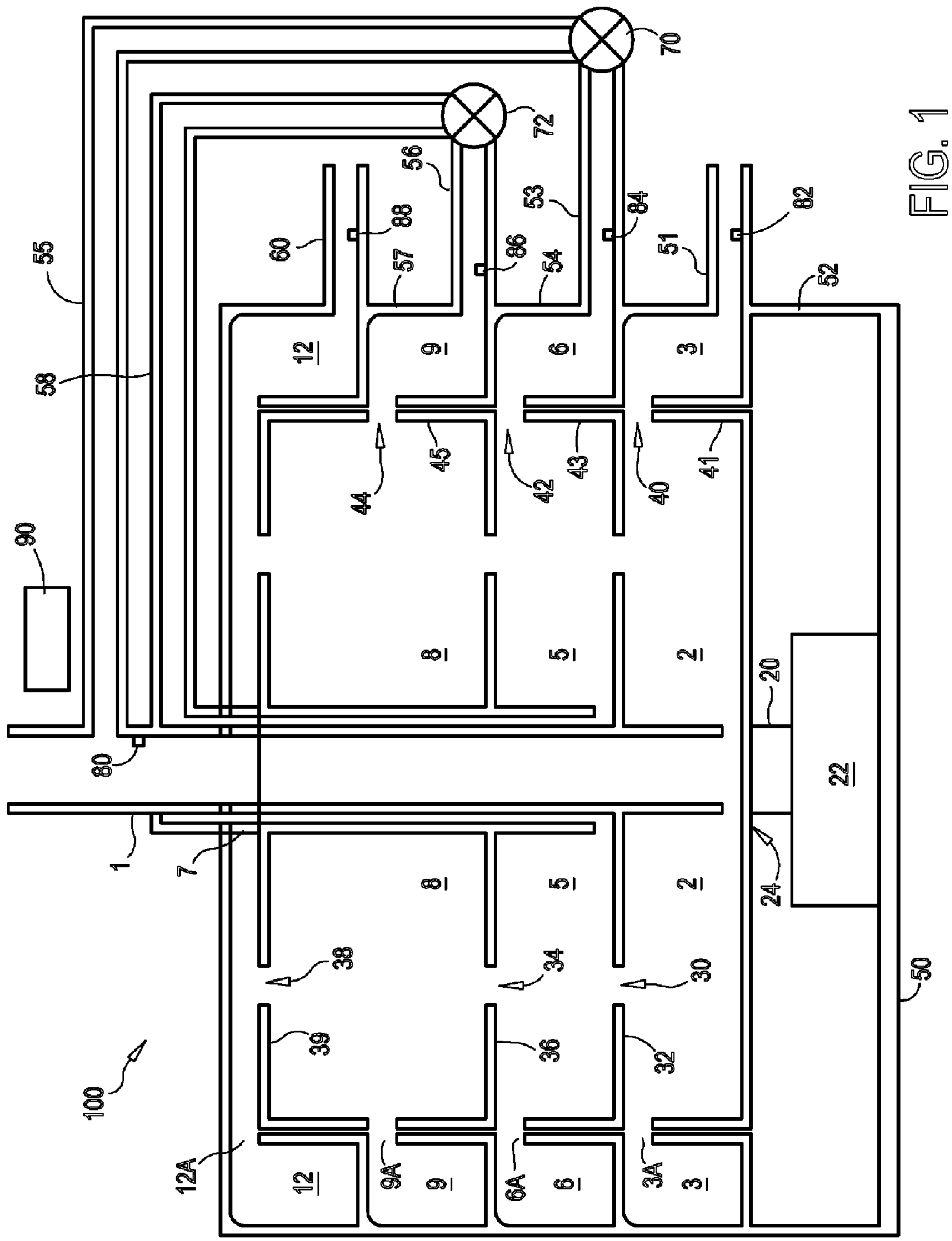
FIG. 1 schematically shows a sectional view through a centrifugal separator according to the invention.

Referring now to the drawings, the centrifugal separator for separating substances including heavy and light matter according to the invention is generally designated by the numerals 100 and 100'. With respect to a light matter configuration used to separate heavy particles from a fluid which is composed of mostly light particles, the centrifugal separator 100 is employed. For purposes of the drawings, like numerals describe like parts in the embodiments.

In each embodiment, there are provided a plurality, e.g., three, stacked or layered lower chamber 2, mid chamber 5, and upper chamber 8 which can be individual chambers separately connected or integrally formed. For purposes of illustration, the chambers 2, 5, and 8 can be fixably connected to each other and a rotating drive shaft 20 extending from a drive unit 22 fixably connects to a central part 24 of a bottom portion of lower chamber 2.

In the case of light matter extraction, a conduit 1, which is a centrally located cylinder, feeds fluid input into lower chamber 2 via a series of ports 1A. Chamber 2 can be subdivided into pie shaped areas by walls 2A wherein each wall can have a port 2B in an upper portion thereof to act as an overflow outlet into the adjacent area of the chamber 2. An upper portion of the lower chamber 2 communicates with the lower portion of mid chamber 5 via a port 30 formed in a plate 32 dividing the chambers 2 and 5. Chamber 5 can be subdivided into pie shaped areas by walls 5A wherein each wall can have a port 5B in an upper portion thereof to act as an overflow outlet into the adjacent area of the chamber 5. The upper portion of the mid chamber 5 communicates with the lower portion of the upper chamber 8 via a port 34 formed in a plate 36 dividing the chambers 5 and 8. Chamber 8 can be subdivided into pie shaped areas by walls 8A wherein each wall can have a port 8B in an upper portion thereof to act as an overflow outlet into the adjacent area of the chamber 8. It is to be understood ports 2B, 5B and 8B are not viewable in the perspective shown.

The chambers 2, 5, and 8 are rotatably disposed within an outer container 50 which is subdivided into a lower compartment 3, mid compartment 6, upper compartment 9, and top compartment 12. Lower compartment 3, mid compartment 6, and upper compartment 9 surround each respective lower chamber 2, mid chamber 5, and upper chamber 8 and each compartment 3, 6, and 9 communicates through openings 3A, 6A, and 9A with a respective chamber 2, 5, and 8 via an outlet 40, 42, and 44 formed in a side portion 41, 43, and 45 of each respective chamber 2, 5, and 8. The lower compartment 3 communicates with an outlet 51 formed in a side portion 52 of container 50 for collecting heavy matter residual. The mid compartment 6 communicates with an outlet 53 formed in side portion 54 of container 50 which leads to a line 55 to feed effluent back into the lower chamber 2 via the central conduit 1. The upper compartment 9 communicates with an outlet 56 formed in side portion 57 of container 50 which leads to a feed line 58 to deliver effluent from the upper chamber 8 back into mid chamber 5 via a concentric cylinder 7 via ports 7A to the central conduit 1. Fluid reaching an upper portion of the upper chamber 8 escapes through a port 38 formed in a top plate 39 and passes through port 12A of the top compartment 12 in the container 50 and thus to collection outlet 60 formed in the container 50 where light matter residual is collected. There can be a plurality of ports 30, 34, and 38 and outlets 40, 42, and 44 formed in plates 32, 36, and 39 and sides 41, 43, and 45; respectively. Each compartment 3, 6, 9, and 12 can include a curved corner surface to receive and direct fluid flow from the outlets 40, 42, and 44 and port 38; respectively.

Gravity and then centripetal force moves the fluid from conduit 1 into the rotating chamber 2 where the heavier participles collect peripherally against the side portion 41 and light particles collect centrally. A portion of this fluid escapes through port 40 and collects in the stationary compartment 3. Fluid with concentrated heavy participles from compartment 3 constitutes heavy matter residual and is eliminated from the process through outlet 51.

Lighter fluid from chamber 2 flows into the rotating chamber 5 where the separation process is repeated. Centripetal force again collects the heavier participles peripherally against the side portion 43 and light particles collect centrally. A portion of this fluid escapes through port 42 and collects in the stationary compartment 6. This fluid is pumped via a pump 70 operably connected to line 55 and reenters the conduit 1 where it mixes with the input flow for further refinement. This is the first of two feedback loops which facilitates the elimination of heavy particles from the process.

Lighter fluid from chamber 5 flows into the rotating chamber 8 where the separation process is repeated. Centripetal force again collects the heavier participles peripherally against the side portion 45 and light particles collect centrally. A portion of this fluid escapes through port 44 and collects in the stationary compartment 9. This fluid is pumped via a pump 72 operably connected to line 58 and reenters chamber 5 via a concentric cylinder 7 to the central conduit 1 for further refinement. This is the second of two feedback loops which facilitates the elimination of heavy particles from the process.

Lighter fluid from chamber 8 flows into the stationary compartment 12 where the separation process is completed. Fluid with concentrated light particles from compartment 12 constitutes light matter residual and leaves through the outlet 60.

By so providing the present invention, there is an opportunity to increase the efficiency of the centrifugal separator 100 through several process control modifications. The establishment of monitor points with feedback loop control in the process will allow for increased efficiency. The present invention contemplates operably connecting sensors 80, 82, 84, 86, and 88 to a computer based device 90 having monitoring software thereon to achieve such monitoring. The purpose of this process control method is to insure a constant light matter residual flow rate of desired concentration.

One sensor 80 can be deployed in conduit 1 below the line 55 to provide a first monitor point. Normal concentration fluctuations of the input fluid are to be expected. If the concentration of heavy particles is more than expected, then more heavy matter residual can be released. Since more heavy matter residual is being released, then more input fluid can be introduced to maintain the light matter residual flow rate. If the concentration of heavy particles is less than expected, then less heavy matter residual can be released. Since less heavy matter residual is being released, then less input fluid can be introduced to maintain the light matter residual flow rate.

Another sensor 82 can be deployed in outlet 51 to provide a second monitor point. If the heavy matter residual concentration is below the expected, then the heavy matter residual leaving the first stage may be restricted. If the heavy matter residual concentration is above the expected, then the heavy matter residual leaving the first stage may be increased. This monitor point works with the first monitor point to insure a constant fluid flow rate through the centrifugal separator 100.

A third sensor 84 can be deployed in outlet 53 to provide a third monitor point on the first feedback loop from stage two. If the heavy particle concentration is below the expected, then the fluid leaving the second stage to the first feedback loop may be restricted. If the heavy particle concentration is above the expected, then the heavy matter residual leaving the first stage may be increased. This condition will apply if the first stage flow is restricted.

A fourth sensor 86 can be deployed in outlet 56 to provide a fourth monitor point on the second feedback loop from stage three. If the heavy particle concentration is below the expected, then the fluid leaving third stage to the second feedback loop may be restricted. If the heavy particle concentration is above the expected, then the fluid leaving the second stage to the first feedback loop may be increased. This condition will apply if the second stage flow is restricted.

A fifth sensor 88 can be deployed in outlet 60 to provide a fifth monitor point on the light matter residual line to insure product quality. If the heavy particle concentration is below the expected, then the process is working better than expected. If the heavy particle concentration is above the expected, then the fluid leaving the third stage to the second feedback loop may be increased. This condition will apply if the third stage flow is restricted.

Therefore, the purpose of this process control method to insure a constant light matter residual flow rate of desired concentration is achieved.

In another embodiment, there is provided a heavy matter extraction configuration which employs centrifugal separator 100'. This configuration is used to separate light particles from a fluid which is composed of mostly heavy particles.

Figure 2:
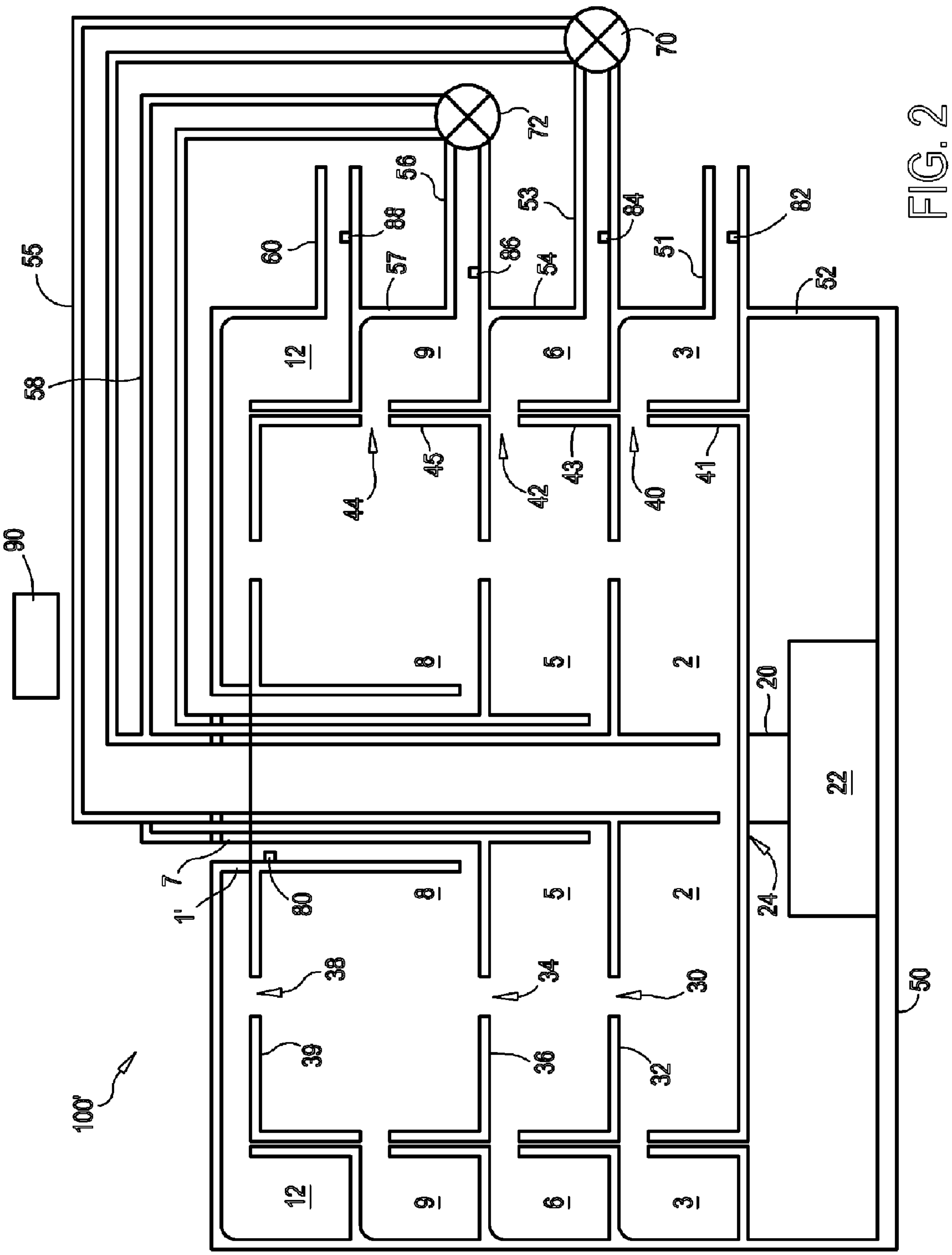
FIG. 2 schematically shows a sectional view through another centrifugal separator according to the invention.
Figure 3A:
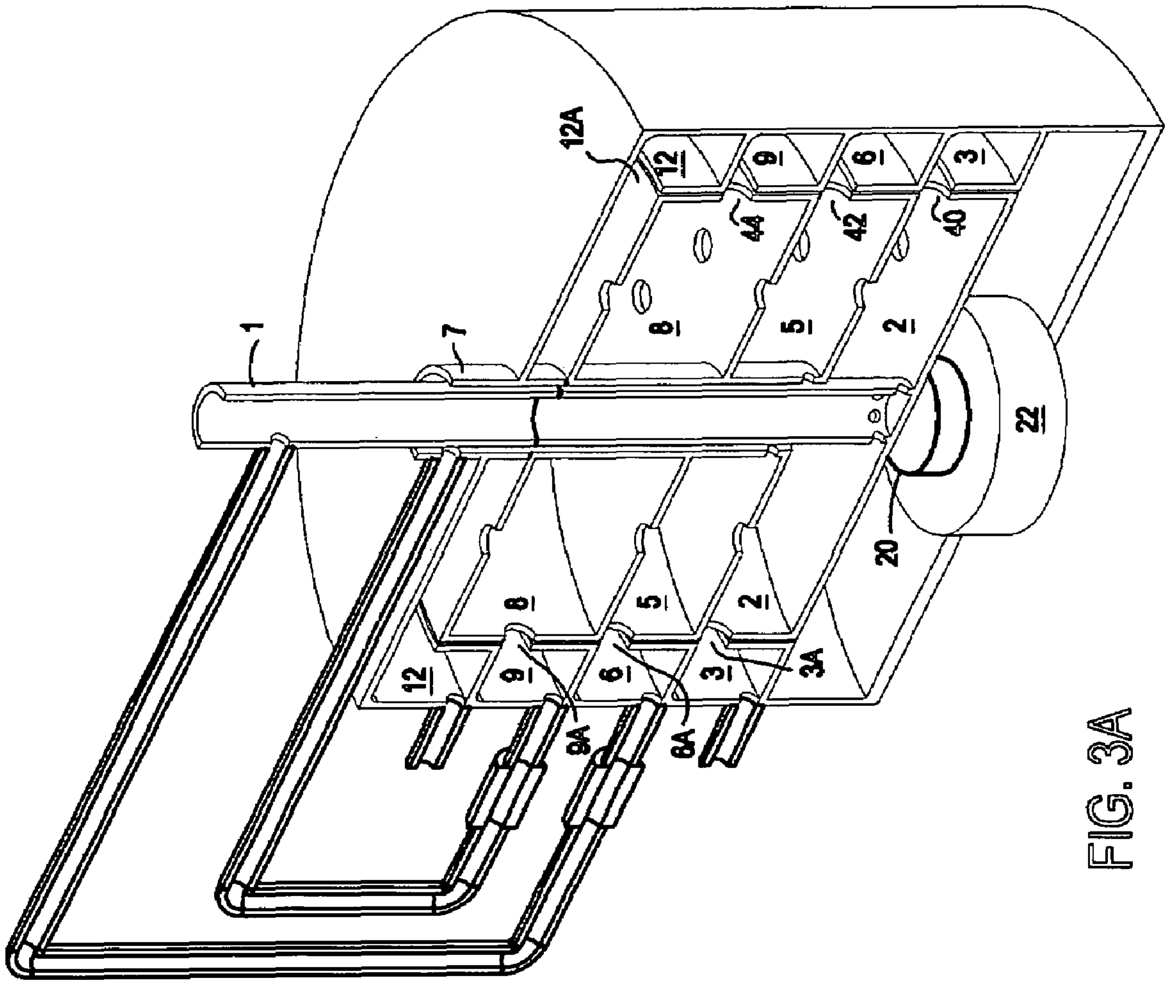
FIG. 3A shows a perspective embodiment of a centrifugal separator according to FIG. 1 seen from above.
Figure 3B:
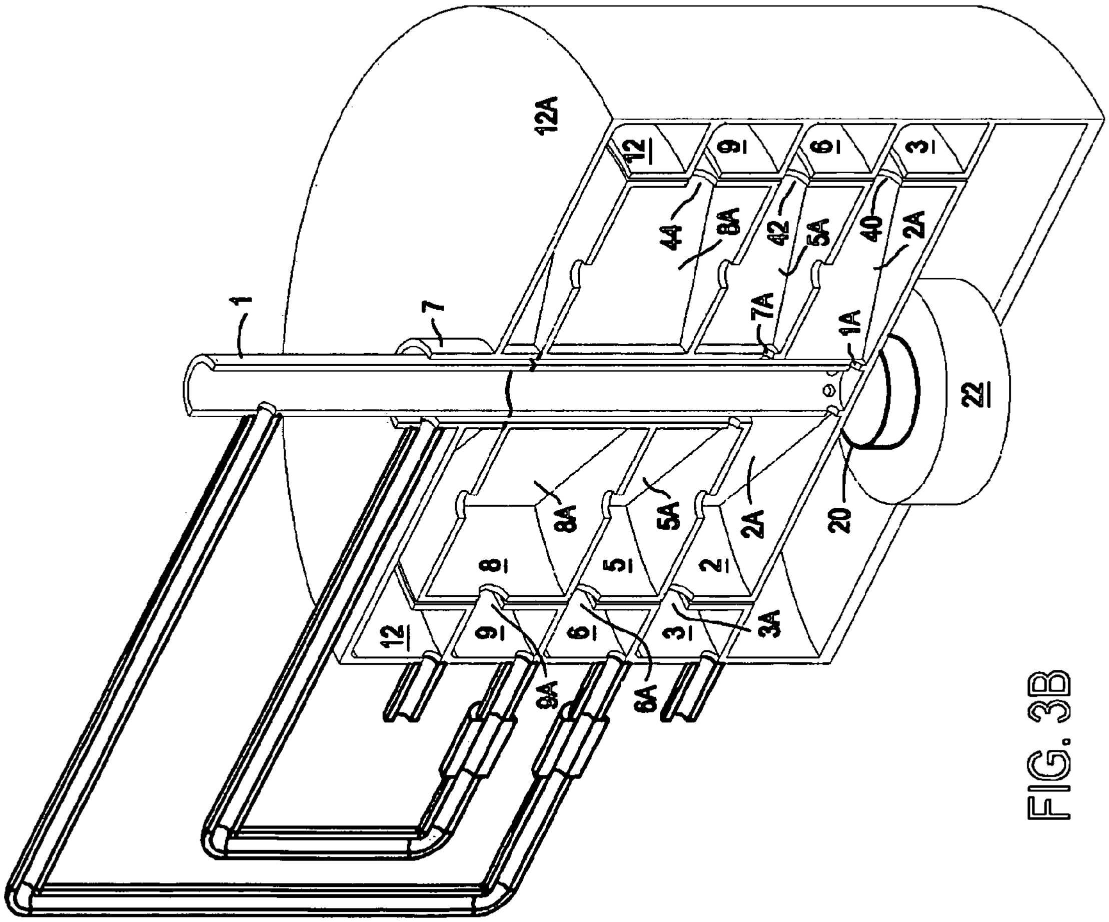
FIG. 3B shows a perspective embodiment of a centrifugal separator according to FIG. 1 seen from above as further modified to include subdivided areas.
Figure 4A:
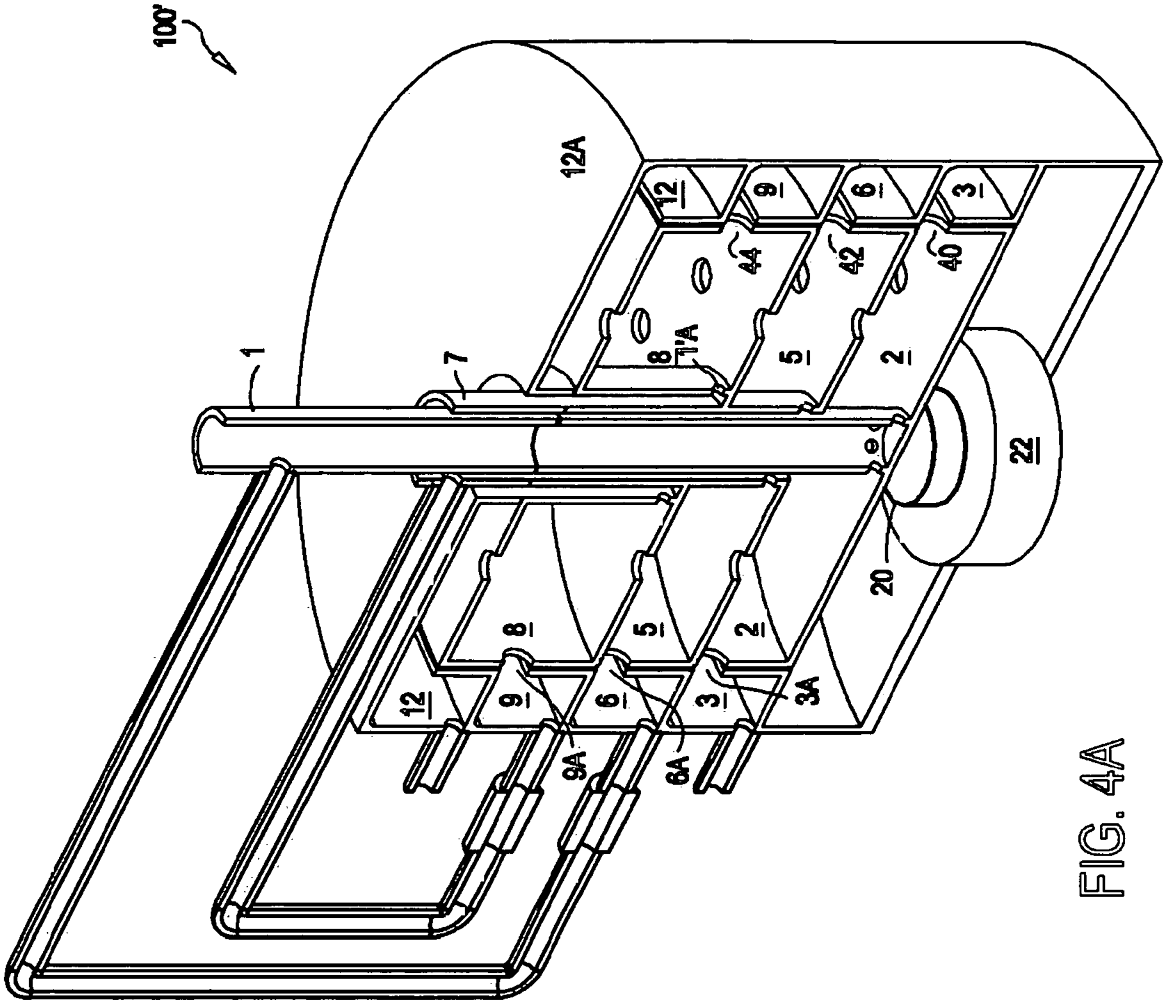
FIG. 4A shows a perspective embodiment of a centrifugal separator according to FIG. 2 seen from above.
Figure 4B:
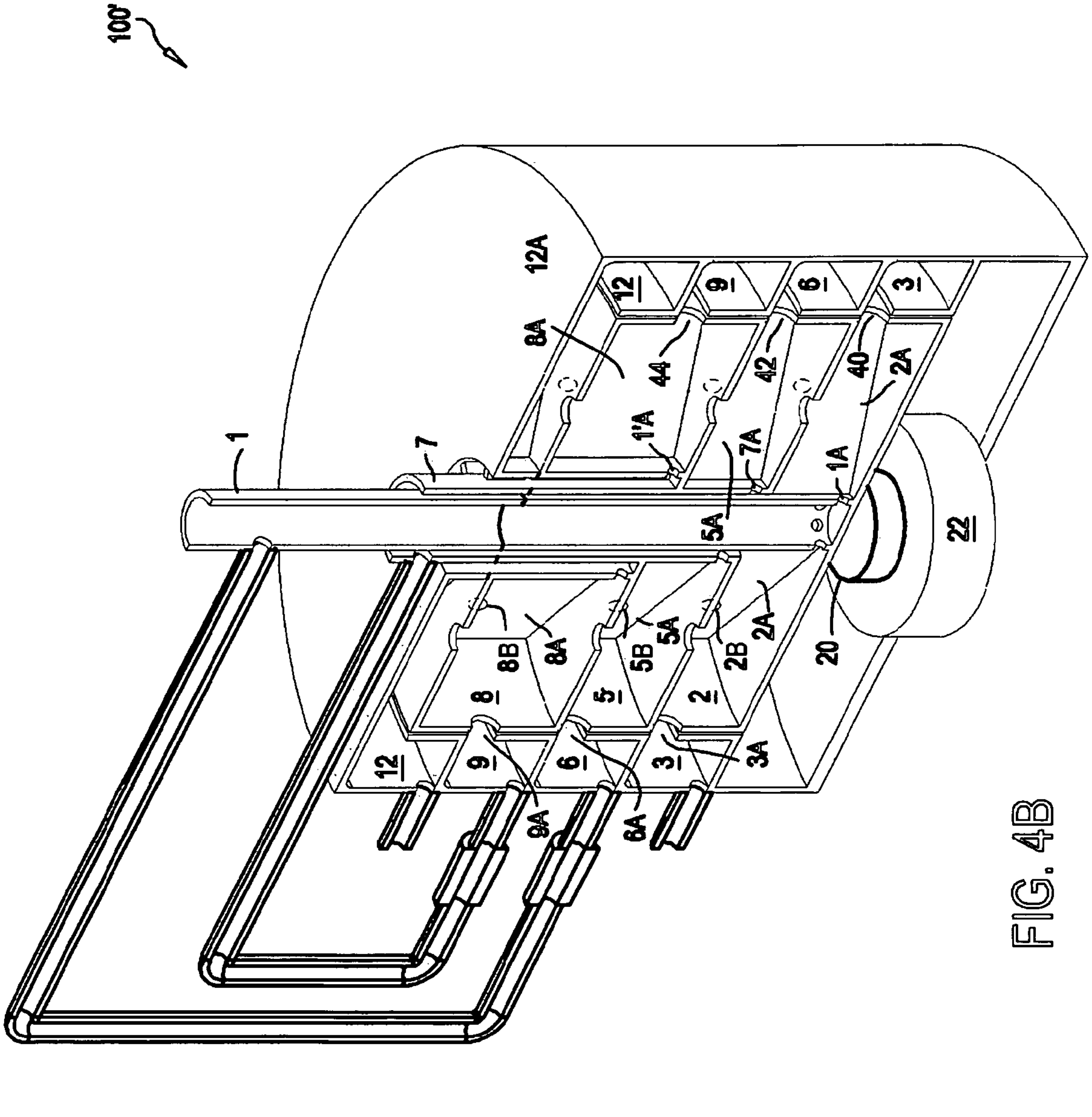
FIG. 4B shows a perspective embodiment of a centrifugal separator according to FIG. 2 seen from above as further modified to include subdivided areas.
Figure 5:
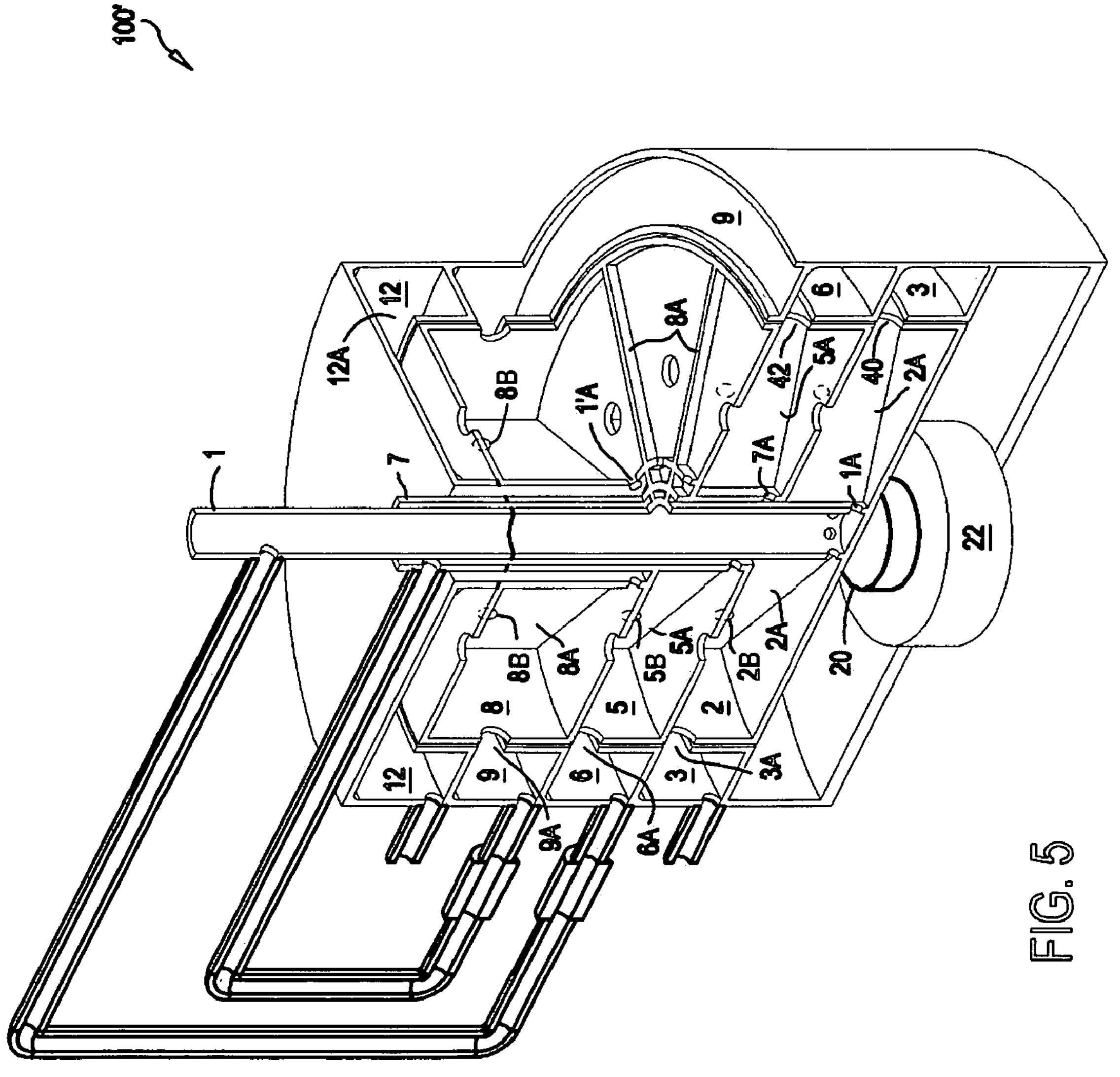
FIG. 5 shows a top view of through a part of the invention.

The two embodiments are essentially the same save for the initial input conduit in this instance provides input fluid through conduit 1' via ports 1'A, which can be an outermost of three centrally located concentric cylinders as seen in FIG. 2. Once loaded with material, the operation is similar to that of the first embodiment.

What is claimed is:

1. A centrifugal separator, which includes:

a container having an outer lower compartment, an outer mid compartment, an outer upper compartment, and an outer a top compartment;

a lower chamber disposed radially inwardly of from said lower compartment by a side of said lower chamber, a mid chamber disposed radially inwardly of said mid from said mid compartment by a side of said mid chamber, and an upper chamber disposed radially inwardly of said upper from said upper compartment by a side of said upper chamber, wherein said lower compartment communicates with said lower chamber via an outlet formed in said side of said lower chamber, said mid compartment communicates with said mid chamber via an outlet formed in said side of said mid chamber;

said upper compartment communicates with said upper chamber via an outlet formed in said side of said upper chamber;

means for rotating said chambers wherein said chambers rotate within said compartments;

said lower compartment communicates with an outlet formed in a side portion of said container for passing heavy matter residual therethrough;

said lower chamber communicates with said mid chamber via a first port formed between said lower and mid chambers;

said mid compartment communicates with an outlet formed in another side portion of said container which connects to a first feed line to feed effluent from said mid chamber back into said lower chamber;

said mid chamber communicates with said upper chamber via a second port formed between said mid and upper chambers;

said upper compartment communicates with an outlet formed in another side portion of said container which leads to an inlet to a second feed line to feed effluent from said upper chamber back into said mid chamber; and a third port formed in an upper portion of said upper chamber through which light matter residual passes to permit collection thereof.

2. The centrifugal separator of claim 1, which includes an input conduit to feed input into said lower chamber.

3. The centrifugal separator of claim 1, wherein said input conduit is a central conduit.

4. The centrifugal separator of claim 3, wherein said first feed line is connected to said central conduit.

5. The centrifugal separator of claim 4, wherein said second feed line is connected to a concentric conduit disposed about said input conduit and terminating in said mid chamber.

6. The centrifugal separator of claim 1, which includes an input conduit to feed input into said upper chamber.

7. The centrifugal separator of claim 1, wherein said chambers are connected to one another.

8. The centrifugal separator of claim 1, wherein each said chamber is further characterized to include a radially extending inner wall thereby defining separated areas within each chamber.

9. The centrifugal separator of claim 8, wherein each said radially extending inner wall includes a port to permit communication between said areas.

10. The centrifugal separator of claim 1, wherein said compartments include a curved channel surface to aid in directing fluid flow when received in said compartment.

11. The centrifugal separator of claim 1, wherein each said chamber is further characterized to include at least two radially extending walls, a top wall, a bottom wall, and said side.

12. A method of separating light and heavy matter which includes the steps of:

(a) employing a centrifugal separator having container having an outer lower compartment, an outer mid compartment, an outer upper compartment, and an outer top compartment; a lower chamber disposed radially inwardly of from said lower compartment by a side of said lower chamber, a mid chamber disposed radially inwardly of said mid from said mid compartment by a side of said mid chamber, and an upper chamber disposed radially inwardly of said upper from said upper compartment by a side of said upper chamber, wherein said lower compartment communicates with said lower chamber via an outlet formed in said side of said lower chamber, said mid compartment communicates with said mid chamber via an outlet formed in said side of said mid chamber; said upper compartment communicates with said upper chamber via an outlet formed in said side of said upper chamber, said lower compartment communicates with an outlet formed in a side portion of said container for passing heavy matter residual therethrough, said lower chamber communicates with said mid chamber via a first port formed between said lower and mid chambers, said mid compartment communicates with an outlet formed in another side portion of said container which connects to a first feed line to feed effluent from said mid chamber back into said lower chamber, said mid chamber communicates with said upper chamber via a second port formed between said mid and upper chambers, said upper compartment communicates with an outlet formed in another side portion of said container which leads to an inlet to a second feed line to feed effluent from said upper chamber back into said mid chamber, and a third port formed in an upper portion of said upper chamber through which light matter residual passes to permit collection thereof; and (b) inputting a substance having heavy matter and light matter therein into one of said chambers of said separator;

(c) rotating said chambers within said compartments to cause said separation of said heavy matter and said light matter, wherein at least a portion of said heavy matter passes through at least one said outlet and a portion of said light matter passes through said third port to enable recovery thereof.

13. The method of separating light and heavy matter of claim 12, wherein the step (a) includes inputting said substance into said lower chamber.

14. The method of separating light and heavy matter of claim 12, wherein said step (a) is performed through a central conduit.

15. The method of separating light and heavy matter of claim 12, which includes delivering part of said substance through said second outlet back into said lower chamber.

16. The method of separating light and heavy matter of claim 12, which includes delivering part of said substance through said third outlet back into said mid chamber.

17. The method of separating light and heavy matter of claim 12, wherein the step (a) includes inputting said substance into said upper chamber.

* * * * *